United States Patent Office 3,366,449
Patented Jan. 30, 1968

3,366,449
PROCESS FOR THE PRODUCTION OF
BARIUM HYDROXIDE
John Geoffrey Marshall, Bletchley, Anthony MacDonald
Hildon, Dunstable, and Alfred Edward Oates and
George Clennett, Luton, England, assignors to Laporte
Chemicals Limited, Luton, England, a British company
No Drawing. Continuation-in-part of application Ser. No.
147,144, Oct. 24, 1961. This application Dec. 31, 1963,
Ser. No. 334,924
Claims priority, application Great Britain, Oct. 23, 1963,
41,859/63
7 Claims. (Cl. 23—186)

This application is a continuation-in-part application of application Ser. No. 147,144 filed Oct. 24, 1961, now abandoned.

This invention relates to a process for the production of barium hydroxide of high purity, especially barium hydroxide of at least 99.5% purity, from barium sulphide, particularly aqueous solutions of barium sulphide obtained by the water extraction of the clinker resulting from the coke or like reduction of barytes.

Barium hydroxide is an important compound of commerce and has hitherto been produced by a variety of methods. In one known process, for example, barium carbonate is reacted with carbon at a high temperature, as in an electric furnace, the resulting impure oxide being dissolved in water and recrystallised. In another prior art process, barium carbonate or barium sulphate is treated with silica in a rotary kiln at a very high temperature to produce a dibarium silicate which is then hydrolysed to produce a dilute solution of barium hydroxide and monobarium silicate which must be recycled. These and similar processes for the production of barium hydroxide are costly, and involve the use of high temperature and costly raw materials as well as excessive recycling of intermediates.

Methods of producing barium hydroxide from readily available barium sulphide have long been sought.

It has been proposed in U.S. Patent 3,013,861 to obtain barium hydroxide from barium sulphide solution by passing said solution through a body of internally bi-functional ion exchange resin and eluting the body of resin with water to re-cover barium hydroxide. Such a process recovers up to 50% of the barium and by the nature of the resin employed cannot give a clean separation of barium and sulphide ions. In such a process the ion which is least retarded is recovered with less dilution than the ion which is more retarded. This results in fractions of varying composition being obtained as effluent from the resin. Furthermore the regenerant for the resin must be water otherwise another cation is added to the system and the barium hydroxide will be contaminated with compounds of that other cation.

It is an object of the present invention to provide a process for obtaining barium hydroxide of high purity from aqueous barium sulphide solution by an ion exchange resin process, and in the process to obtain, quite separately and distinctly from the barium hydroxide a sulphide of sodium or potassium. The latter compounds are important in their own right.

It is a further object of the invention to provide a continuous process for obtaining barium hydroxide and sodium or potassium sulphide from hot concentrated aqueous barium sulphide solutions.

The present invention provides a process for the substantially separate production of barium hydroxide and a sulphide selected from sodium sulphide and potassium sulphide, from an aqueous solution of barium suphide, comprising the steps of firstly contacting the barium sulphide solution with an ion exchange resin selected from the group consisting of strongly acidic cation exchange resins in the sodium form, strongly acidic cation exchange resins in the potassium form and strongly basic anion exchange resins in the hydroxyl form, secondly isolating the resultant solution from the ion exchange resin, which solution contains barium hydroxide when the exchange resin is the anion exchange resin and contains the sulphide of the cation of the cation exchange resin when the latter is used, and thirdly contacting the isolated exchange resin with a sufficient quantity of a regenerant solution selected from solutions of sodium and potassium hydroxide at least partially to regenerate the resin and in the case of anion exchange resin simultaneously to yield a solution of the sulphide of the cation of the regenerant solution and in the case of cation exchange resin simultaneously to yield a solution of barium hydroxide.

In accordance with one aspect the invention provides a process for the substantially quantitative separate production of barium hydroxide and a sulphide selected from sodium sulphide and potassium sulphide from an aqueous solution of barium sulphide comprising the steps of firstly contacting the barium sulphide with an ion exchange resin selected from the group consisting of strongly acidic cation exchange resins in the sodium form, strongly acidic cation exchange resins in the potassium form and strongly basic anion exchange resins in the hydroxyl form, the solution and the resin being employed in amounts such that resin does not become exhausted, secondly isolating the resultant solution from the ion exchange resin, which solution is one of barium hydroxide and is one of the sulphide of the cation of the cation exchange resin when the latter is used when the exchange resin is the anion exchange resin and thirdly contacting the isolated exchange resin with a sufficient quantity of a regenerant solution selected from solutions of sodium and potassium hydroxide at least partially to regenerate the resin and in the case of anion exchange resin simultaneously to yield a solution of the sulphide of the cation of the regenerant solution and in the case of cation exchange resin simultaneously to yield a solution of barium hydroxide.

The present invention further provides a process for preparing barium hydroxide from an aqueous solution of barium sulphide, which comprises the steps of contacting a strongly acidic cation exchange resin in the sodium or potassium form with an amount of a barium sulphide solution such that some barium sulphide remains untreated, separating the exchange resin from the resultant solution and thereafter contacting the exchange resin with sodium or potassium hydroxide solution to yield a solution containing barium hydroxide, from which barium hydroxide is collected, for example by crystallisation. Preferably the quantity of barium sulphide solution employed is an excess over the exchange capacity of the resin employed.

We have found that strongly acidic cation exchange resins (particularly the preferred resins referred to later) have surprisingly good physical and chemical stability under the conditions of considerable alkalinity and temperature often involved in the present process. The present process, especially when employing the various preferred features herein mentioned, utilises the exchange capacity of the resin to a much greater degree, for example about 80% to 90% and this clearly results in increased production of barium hydroxide from each use of the resin. However, surprisingly, there is little or no increase in the rate of destruction of the resin resulting from this more severe treatment of it, even after extended periods of continuous operation.

Suitably the exchange resins employed are macro-reticular (also called macro-porous) resins, being highly cross-linked sulphonated polystyrene resins. It is also possible to employ the gel-type exchange resins, particularly sulphonated polystyrenes cross-linked with divinyl benzene. In these the degree of cross-linking is preferably high, i.e., above 10%, and advantageously about 20%. It is found that such resins do not expand and contract to any large extent during operation in processes according to the invention. Since expansion and contraction are due to uptake and release of water, this means the resins do not materially alter the concentrations of the solutions with which they are contacted.

One preferred procedure in accordance with the invention is to employ a column packed with the cation exchange resin, to pass barium sulphide solution at least until it appears in the effluent; to displacement wash the resin, suitably with pure water; to elute with sodium hydroxide solution; and once again to displacement wash (with water, recycled backflush liquor, or a suitable gas, for example nitrogen) the resin. The cycle can then be repeated. Preferably, after each of the displacement washes, the resin is given a more thorough washing. This thorough washing is advantageously conducted by backflushing the resin with at least one bed volume of hot water, the water being forced through a sufficient velocity to fluidise the resin. The temperature of the water is preferably the same as that of the barium sulphide feed. This expedient serves among other things to remove insoluble materials, e.g., $BaCO_3$, thereby minimising pressure drop across the resin bed.

The concentration of the barium sulphide solution employed is preferably 20 to 25% w/w, but can be up to about 30%. It is preferred to use such concentrated solutions at temperatures about 10° C. above their crystallisation temperatures. Thus a 20 to 25% w/w solution is employed at about 75–80° C. It is preferred to use about 100% to 200% excess (over the exchange capacity of the resin) of barium sulphide solution. It is preferred to pass the barium sulphide solution downwardly through a column of the exchange resin. It is further preferred that the rate of feed of the barium sulphide solution is about 4 to 12 bed volume/hr. suitably 4 to 8, and the possibility of employing rates of this order is a further and unexpected advantage stemming from the invention.

The effluent from the resin in this step contains both barium sulphide and sodium or potassium sulphide depending on the original cation of the resin.

The alkali metal sulphide is a useful material in its own right and can be freed from the barium sulphide for example, by treating the effluent with an alkali metal carbonate. This precipitates the barium as the carbonate, which is also a very useful commercial product. Alternatively the effluent can be fed to one or more further ion exchange columns, operated in accordance with the invention, and if desired finally to a column operated according to the process described in the parent application. In this case the effluent from the final column will be the alkali metal sulphide substantially free from barium sulphide.

The alkali hydroxide solution employed in the barium hydroxide forming step is desirably one of sodium hydroxide and can be up to about 30% strength, preferably about 16%, i.e., 4 N. The solution is preferably hot, advantageously from 50–90° C. The solution is preferably employed in excess over the barium content of the resin. Preferably, this excess is in order of 200–400%. If desired the alkali hydroxide solution can be passed through the exchange resin the opposite direction from that of the barium sulphide. The preferred rate of feed of the hydroxide solution is from about 2 to 10 suitably 2 to 6 bed volumes/hr. Normally, rates at the lower end of this range are suitable with the gel type resins, whilst the higher rates are suitable with the macro-reticular type.

As the result of conducting the alkali hydroxide step in the preferred manner, the eluate obtained is a hot solution of barium hydroxide of about 1½ N concentration, containing sodium hydroxide to about 2 N concentration. On cooling such a solution to 20° C. upwards of 95% of the barium hydroxide crystallises. It is of very high purity with respect to sulphide ion, and can have less than 50 p.p.m. Clearly, the mother liquor remaining is of very low barium hydroxide concentration and, after suitable additions of sodium hydroxide and water to restore its alkali concentration, the mother liquor is very suitable for recycling for further use.

The invention thus provides for continuous operation in which various by-product solutions can be recycled and from which a steady flow of final product (of high yield and purity), viz: barium hydroxide, is obtained.

The following examples further illustrate the invention:

Example 1

The process illustrated in this example consists of a cycle of six steps.

In the first step, approximately 21% (50°Tw) barium sulphide liquor at 75° C. was passed downwards, at a uniform flow rate through a column of Permutit ZeoKarb 225 SRC 21 resin (which is largely in the sodium form), giving an effluent of a mixed solution of sodium and barium sulphide. Approximately a two-fold quantity of BaS (based on the exchange capacity of the resin) was used, and the time required for this step was 15 minutes. The resin was largely in the barium form at this stage.

In the second step, wash water at 75° C. was passed downwards, first displacing further mixed sulphide effluent, then passing through the resin column and out as a dilute sulphide liquor wash effluent.

The third step was an upward backflush with one bed column of fresh water at 80–85° C. forced in at sufficient velocity to fluidise the resin and free the resin particles, thereby removing some of the accumulated insoluble solids, such as barium carbonate.

In the elution step which follows, a four-fold quantity (over the exchange capacity of the resin) of a caustic soda liquor eluant, containing 15% NaOH at a temperature 80°–90° C. was passed upwards through the column at a uniform rate over a period of 45 minutes. At first this displaced residual wash effluent which overflowed at the top of the column. This was followed by the product stream containing varying proportions of $Ba(OH)_2$, and NaOH. The product stream was passed directly into a crystalliser where barium hydroxide octahydrate separated out on cooling. The mother liquor from the crystalliser was retained, and NaOH and water (as necessary) were added to bring it to the above eluant concentration for further use in elution step of another cycle.

The product liquor remaining in the bed was then displaced with hot water (75° C.) and the final step was a backflush, as step 3, which fluidised the resin. The resin was once again largely in the sodium form and was then ready for the whole cycle of steps to be repeated. This process utilised about 85% of the resin's exchange capacity.

Example 2

The process illustrated in this example consists of a cycle of a similar nature to that described in Example 1.

Barium sulphide solution (21%—50°Tw) at 75° C. was passed downwards at a uniform flow rate through a column of Amberlite 200 resin (which was largely in the sodium form), giving an effluent of a mixture of sodium and barium sulphide in the solution. Approximately a 70% excess (based on the capacity of the resin) of barium sulphide was used and the time required for this step was 15 minutes. The resin was largely in the barium form at the end of this step.

The 2nd and 3rd steps were as in Example 1.

In the elution step, 15% NaOH solution at a temperature of 80–90° was passed downwards at a uniform flow rate through the column. This yielded the product solution which was a mixed solution of NaOH and $Ba(OH)_2$. Approximately, a four-fold quantity (based on the capacity of the resin) of NaOH was used and the time required for this step was 15 minutes.

Final steps were as in Example 1.

The resin was once again largely in the sodium form and the cycle can be repeated. This process utilised about 80% of the resin's exchange capacity.

Example 3

In the first step, approximately 20% (44°Tw) barium sulphide liquor at 70° C. was passed downwards at a uniform flow rate through a column of Permutit ZeoKarb 225 SRC 21 resin (which was largely in the sodium form) giving an effluent of a mixed solution of sodium and barium sulphide. The quantity of barium sulphide liquor used was equivalent to 2.5 times the exchange capacity of the resin, and the time required for this step was 8 minutes. The resin was largely in the barium form at this stage.

In the second step, one bed volume of dimineralised water at 75° C. was passed downwards, first displacing further mixed sulphide effluent, then passing through the resin column and out as a dilute sulphide liquor was effluent. The time required for this step was 6 minutes.

In the third step, one bed volume of dimineralised water at 75° C. was passed downwards through the resin column and out as a dilute sulphide liquor wash effluent. The time required for this step was 6 minutes.

In the elution step, a 16% NaOH solution at a temperature of 70° C. was passed downwards at a uniform flow rate through the column. Approximately a 10 fold quantity of NaOH (based on the exchange capacity of the resin) is used and the time required for the step was 30 minutes. At first this displaced residual wash effluent liquor. This was followed by the product stream containing varying proportions of Ba(OH)$_2$ and NaOH. The product stream is passed directly into a crystalliser where barium hydroxide separated out on cooling. The mother liquor from the crystalliser was retained, and NaOH and water were added (as necessary) to bring it to the above eluant concentration for further use in the elution step of another cycle.

The fifth step was a downward water wash of one bed volume at 75° C., first displacing further product and then passing through the resin column and out as dilute product.

The sixth step was a water wash of one bed volume at 75° C. passing downwards through the resin column and out as dilute product liquor. This liquor was retained and used in the place of water in the fifth step of the next cycle.

The final step was an upwards backflush with a bed volume of demineralised water at 75° C., pumped in at sufficient velocity to fluidise the resin and free the resin particles. The effluent was retained and used in the place of the water in the sixth step of the next cycle.

The resin was once again largely in the Na form and the cycle was repeated. After the series of more than three hundred cycles the resin was still acting normally despite the fact that it had throughout been alternately contacted with hot concentrated solutions of electrolytes and hot water.

In each of the above examples the effluent from the first step, and desirably also the second step, can be treated with a soluble sodium compound, suitably sodium carbonate, to obtain the barium content as an insoluble barium compound (after removal of the barium compound the solution is concentrated and sodium sulphide crystallised therefrom). By operating in this manner the total yield of Ba$^{++}$ approaches 100% of that of the barium sulphide starting material.

Example 4

100 g. of a fresh, strongly basic anion exchange resin in the hydroxyl form are packed to form a bed of about 140 ml. in volume. The resin employed is that sold under the name "Amberlite IRA-410."

700 ml. of a 3% aqueous barium sulphide solution at room temperature obtained by the water-extraction of the clinker resulting from the coke-reduction of barytes, are passed through the bed and the effluent collected. The resin exchanges hydroxyl ions for the sulphur-containing ions (e.g., S$^{--}$, SH$^-$) in the solution and also the effluent thus contain barium hydroxide. Upon concentrating and crystallising this effluent, barium hydroxide octahydrate is obtained having a purity of more than 99.5%.

It is found that the above quantity of barium sulphide solution substantially exhausts the exchange capacity of the resin and the effluent from any further additions of barium sulphide solution would include sulphur-containing ions.

One equivalent of a normal sodium hydroxide solution is then passed upwardly through the bed. This treatment reconverts about 60% of the resin to the hydroxyl form and so in the next barium sulphide treatment about 400 ml. of solution can be used, before the resin becomes exhausted. The effluent from the bed contains sodium sulphide, which on concentration and crystallisation yields Na$_2$S.9H$_2$O of 97% purity. The mother liquor contains 29% sodium hydroxide and about 5% Na$_2$S and this liquor, mixed with fresh sodium hydroxide to the required proportions can be recycled and used for subsequent resin regenerations. In these subsequent regenerations with one equivalent of normal sodium hydroxide solution the resin's exchange capacity is renewed to substantially that which it was after the first regeneration, and hence in all cycles subsequent to the first 400 ml. portions or thereabouts of the barium sulphide solutions are used.

Example 5

The bed described in Example 4 was replaced by a strongly acidic cation exchange resin, viz: that sold under the trade name "Permutit Zeo-Karb 225," in the sodium form.

800 ml. of the barium sulphide solution referred to in Example 1 are passed through the bed at room temperature. The resin exchanges sodium ions for barium ions in the solution and the effluent is a sodium sulphide containing solution which can be concentrated and crystallised to give Na$_2$S·9H$_2$O. It is found that the above quantity of solution substantially exhausts the exchange capacity of the resin.

The resin is then treated as in Example 1 with one equivalent of normal sodium hydroxide solution. This treatment reconverts about 30% of the resin to the sodium form and so in the next barium sulphide treatment about 250 ml. of solution can be used before the resin is exhausted.

The effluent from the sodium hydroxide treatment is a solution containing barium hydroxide and excess sodium hydroxide from which solution, after concentration, barium hydroxide octahydrate is crystallised containing 1.3% sodium hydroxide. However, washing with about one volume of cold water reduces the sodium hydroxide content to less than 0.1%. The only other impurities present will be very minute quantities of metal contaminants which might have been present in the original barium sulphide, and thus the purity of the octahydrate is about 99.9%.

The acidic resins exchange capacity is renewed in subsequent regenerations to substantially that which it was after the first regeneration and hence in subsequent cycles 250 ml. portions of the barium sulphide solution are used.

Example 6

A concentrated barium sulphide solution (200 g.p.l.) at a temperature of 70° C. was fed to a bed of Permutit Zeo-Karb 225 cation exchange resin in the sodium form. Barium ions equivalent to 40% of the resin exchange capacity were absorbed before barium ions were detected in the effluent.

The resin was then washed with water and then regenerated with an eightfold excess (with respect to the barium on the resin) of 4 N NaOH at 70° C. In this way 80% of the barium ions on the resin were displaced, and barium hydroxide octahydrate was crystallised from the resultant solution in sodium hydroxide by merely cooling to room temperature. As the mother liquor now contained only 0.3% barium hydroxide it was suitable, after fortification with fresh sodium hydroxide, for re-cycling for further resin regeneration. Thus a hot sodium hydroxide solution of substantially 4 N strength is especially advantageous.

The barium hydroxide octahydrate was washed with one volume of cold water and was then 99.5% pure.

As has been mentioned previously and as illustrated in Examples 1 and 2, one very suitable source of barium sulphide is an aqueous extract of the clinker remaining from the coke or like reduction of barytes. Hitherto in order to obtain barium hydroxide from the extract it has been necessary to subject it to a number of steps including forming barium carbonate and heating to decompose the barium carbonate into the oxide. This extract is normally at a temperature of 70° C. (but might be at any temperature from 50° to 70° C.) and in practice it will be convenient to pass this solution to the ion exchanger. For this reason cation exchange resins are preferred since they are considerably more stable, especially at higher temperature of operation, than the anionic type.

Indeed the stability of the cation resins when employing concentrated barium sulphide solutions at about 70° C., is surprisingly and unexpectedly good considering the strong alkalinity of such solutions. It has been found for instance that one such resin lost only 14% of its exchange capacity after six months employment with 20% strength barium sulphide solution at 70° C.

What we claim is:

1. A continuous process for the essentially quantitative production of barium hydroxide from an aqueous solution of barium sulphide, comprising the steps of
   (a) passing an aqueous solution of barium sulphide being employed at a temperature of 50 to 80° C. and at a concentration of 20 to 30% weight for weight through a column packed with a strongly acidic cation exchange resin selected from the group consisting of highly cross-linked sulphonated polystyrene resins and sulphonated polystyrene resins cross-linked with divinyl benzene and in each of which the cation is selected from the group consisting of sodium and potassium, the rate of flow being about 4 to 12 bed volumes per hour,
   (b) washing the cation exchange resin with water
   (c) passing through the column an excess of a regenerant solution selected from the group consisting of sodium hydroxide and potassium hydroxide, the regenerant solution being employed at a temperature of 50 to 90° C. and at a concentration of about 16 to 30% weight for weight, and the rate of flow being from 2 to 10 bed volumes per hour
   (d) collecting the solution obtained during the previous step and cooling said solution to crystallise therefrom barium hydroxide octahydrate
   (e) washing the cation exchange resin with water
   (f) adding further of the barium sulphide solution and repeating the cycle.

2. A process as claimed in claim 1, wherein after each of the washing steps the ion exchange resin is further washed by passing hot water through the column of resin at sufficient velocity to fluidise the resin.

3. A process as claimed in claim 1, wherein the mother liquor from the step of crystallising barium hydroxide octahydrate is combined with the said regenerant solution.

4. A process as claimed in claim 1 further comprising the steps of treating the effluent solution from the column of ion exchange resin obtained from step (a) to precipitate a barium compound therefrom, and removing the barium compound.

5. A process as claimed in claim 4, wherein the solution remaining after the precipitation of the barium compound is crystallised to produce the sulphide of the cation of the cation exchange resin.

6. A process according to claim 1 wherein the aqueous solution of barium sulphide is passed in one direction through the resin in the sodium form, the sodium sulphide nonahydrate is crystallised from the effluent solution, and an aqueous solution of sodium hydroxide is passed in the reverse direction through the resin.

7. A continuous process for the essentially quantitative production of barium hydroxide from an aqueous solution of barium sulphide comprising the steps of (a) passing an aqueous solution of barium sulphide at a temperature of from about 50° C. to about 80° C. and at a concentration of from about 20% w/w to about 30% w/w through a column packed with a strongly acidic cation exchange resin selected from the group consisting of highly cross-linked sulphonated polystyrene resins and sulphonated polystyrene resins cross-linked with divinyl benzene, in each of which the cation is selected from the group consisting of sodium and potassium, (b) washing the cation exchange resin with water, (c) passing through the column a regenerant solution selected from the group consisting of sodium hydroxide and potassium hydroxide and having a temperature of from about 50° C. to about 90° C. and a concentration of from about 15% to about 30% w/w, (d) collecting the solution obtained during the previous step and cooling said solution to crystallize barium hydroxide octahydrate therefrom, (e) washing the cation exchange resin with water, (f) adding further barium sulphide solution and repeating steps (a) to (e).

References Cited

UNITED STATES PATENTS

| | | | |
|---|---|---|---|
| 2,789,036 | 4/1956 | Tillman | 23—184 |
| 3,013,861 | 12/1961 | Franz | 23—184 |

OTHER REFERENCES

Samuelson: Ion Exchange Separations in Analytical Chemistry, Wiley, New York, 1963, pp. 20, 21.

Osborn "Synthetic Ion-Exchangers" Chapman and Hall Ltd., London 1955 pp. 1–25.

EDWARD J MEROS, *Primary Examiner.*

OSCAR R. VERTIZ, *Examiner.*

J. J. BROWN, *Assistant Examiner.*

UNITED STATES PATENT OFFICE
CERTIFICATE OF CORRECTION

Patent No. 3,366,449

January 30, 1968

John Geoffrey Marshall et al.

It is hereby certified that error appears in the above numbered patent requiring correction and that the said Letters Patent should read as corrected below.

In the heading to the printed specification, line 11, after "Great Britain," insert -- Oct. 26, 1960, 36791/60; --.

Signed and sealed this 29th day of April 1969.

(SEAL)
Attest:

Edward M. Fletcher, Jr.
Attesting Officer

EDWARD J. BRENNER
Commissioner of Patents